Sept. 29, 1970     B. B. MOHS     3,531,153

PIVOTABLE SAFETY SEAT FOR MOTOR VEHICLES

Filed Oct. 7, 1968

BRUCE B. MOHS, INVENTOR.

Joseph G. Werner
John M. Winter

BY ATTORNEYS

United States Patent Office 3,531,153
Patented Sept. 29, 1970

3,531,153
PIVOTABLE SAFETY SEAT FOR MOTOR VEHICLES
Bruce B. Mohs, Waunakee, Wis. 53597
Filed Oct. 7, 1968, Ser. No. 765,558
Int. Cl. B60n 1/02
U.S. Cl. 296—65                                   2 Claims

ABSTRACT OF THE DISCLOSURE

A bucket-type motor vehicle seat suspended from a rigid support member affixed to and extending laterally inward from the side wall of the vehicle. The seat is pivotally suspended above the floor of the vehicle for swinging about both longitudinal and transverse axes. A break-away backstop abuts a bearing plate on the back of the seat to permit the seat to swing rearwardly on impact from the rear of the vehicle.

BACKGROUND OF THE INVENTION

Field of the invention

My invention relates to a pivotally suspended safety seat for motor vehicles which is designed to reduce the effects of both axial and lateral forces to which the vehicle may be subjected.

Description of the prior art

Passenger seats in motor vehicles, such as, automobiles and the like are typically stationary but adjustable forward and backward and for height and tilt. The passengers are held in their seats on collision impact with shoulder and lap seat belts in the well-known manner.

While the known seat belt arrangement has proved to be an important instrument in preventing death and serious injury, it suffers from the inherent drawback that it must be fastened by the occupant upon entry into the vehicle, that is, the occupant must choose and remember to use the device if it is to afford any protection at all. The said fact is, that in spite of the proven success of seat belts, many people just do not use them for one reason or another.

Another shortcoming of the present seat construction in automobiles and the like is that the seats are fastened to the floor of the vehicle and consequently, upon side collision impact the side of the vehicle is smashed inwardly against the occupant of the seat.

In recent years new seating arrangements for motor vehicles have been devised. For instance U.S. Pat. 3,112,955 discloses an airplane seat construction for cushioning the force of frontal impact. Frontal impact or sudden deceleration causes this seat to swing forwardly to a position wherein the bottom portion of the seat takes up the force of the impact and holds the passenger in the seat. This arrangement, while affording protection against frontal impact and rapid deceleration is no better than the typical stationary floor mounted seat is against a lateral impact such as land vehicles are subjected to in a side collision.

U.S. Pat. 2,712,349 relates to a seat for high speed conveyance designed to protect the passenger against sudden deceleration or acceleration by moving forward or backward on an eccentric vertical pivot arm. The occupant is subjected to sudden linear and rotational movements, much like a carnival ride. The entire assembly is quite tall and unsuitable for a motor vehicle such as a passenger car.

Neither of these seat arrangements deals with the problem of the centrifugal force which is exerted on the passenger as the vehicle executes a turn and which causes the passenger to be moved sideways in either of the above mentioned seats.

SUMMARY OF THE INVENTION

My invention of a pivotal swing and sway seat suspended from the side of the supporting vehicle is a complete, simple and comfortable answer to the needs of passenger safety in the operation of today's high speed motor vehicles. The bucket-type seat is suspended above the floor of the vehicle from a rigid support member affixed to and extending inwardly from the side of the vehicle. The seat is mounted for pivotal movement about transverse and longitudinal axes in response to lateral and longitudinal forces.

A sudden backward axial force, such as exerted during rapid deceleration or a frontal collision impact, swings the seat upwardly into a substantially horizontal position whereby the passenger's forward momentum is stopped by the seat bottom instead of a conventional seat belt if the same were buckled.

A sudden forward axial impact, such as when the vehicle is struck from the rear by another vehicle, causes the bearing assembly behind the seat to give way and the seat to pivot backwardly to reduce whiplash injury.

Moreover, my seat solves several problems of known seat arrangements as represented by the aforementioned patents. First, my invention includes a pivotal connection which permits the seat to sway sidewardly in response to centrifugal force. Thus, the passenger's weight is always directed into the seat and he experiences no discomforting "lean" on any type of turn. Secondly, in my invention, the seat is suspended from a metal support bar which is fixedly mounted to a side frame of the vehicle. Therefore, as the side frame member moves inwardly as a result of sudden lateral impact, the lateral support bar also moves the seat inwardly and the passenger avoids the thrust of the indented wall of the vehicle.

My invention thus compensates for any external forces to which the vehicle is subjected, allowing the passenger to ride in comfort and safety.

Other objects, features and advantages of my invention will be apparent from the following detailed description taken in conjunction with the accompanying drawings wherein a preferred embodiment of the invention has been selected for exemplification.

DESCRIPTION OF A PREFERRED EMBODIMENT

Figure 1:
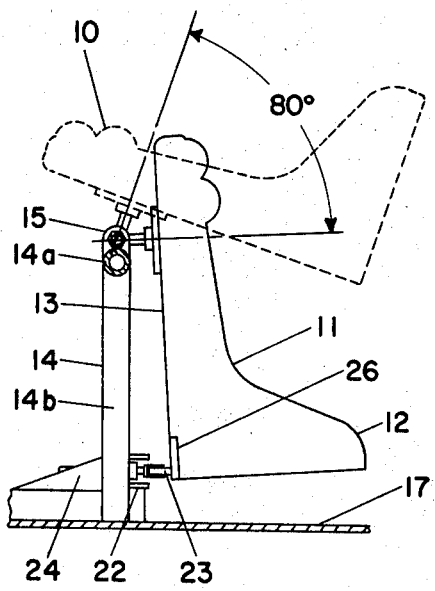
FIG. 1 is a fragmentary side elevation view of a motor vehicle seat embodying principles of my invention. The seat is shown in normal position in full lines and swung into substantially horizontal position on impact in phantom lines.

Referring now more particularly to the drawings wherein like numerals refer to like parts throughout the several views, my pivotal motor vehicle safety seat assembly is generally shown at 10. The seat assembly has an individual bucket seat 11, comprising a horizontal bottom portion 12 joined to an upright back portion 13 which is supported on a metal support member 14 by a pivotal connecting means 15.

The metal support member 14 shown in the drawings comprises an L-shaped tubular steel pipe having a horizontal leg 14a rigidly supported from a horizontal side frame member 16 of the vehicle. The vertically disposed leg 14b is anchored to the floor 17 of the vehicle. While an L-shaped member is shown in the drawings, it is understood that the entire support member may comprise merely the horizontal leg cantilevered from the side frame member 16 of the vehicle.

The bucket seat 11 is suspended at its back portion 13 from the inwardly protruding horizontal leg 14a of the support member 14 by pivotal connecting means 15. This unique side mount arrangement provides considerable more safety for the passenger than the floor mounted type automobile seat. In a collision where the vehicle is struck broadside, the seat, being suspended from the side frame of the vehicle on a transverse support member 16, will move inwardly as the side of the car is smashed in from the impact. Thus, the lateral support leg moves the seat away from the thrust of the impact.

In the conventional floor supported seat arrangement, when the automobile is struck broadside, the doors and side of the vehicle may be abruptly forced inwardly relative to the floor supported seat. Unlike my novel seat supporting arrangement, in this conventional construction, the occupant of the seat may receive a severely damaging blow from contact with the inwardly moving side wall of the vehicle.

Figure 2:
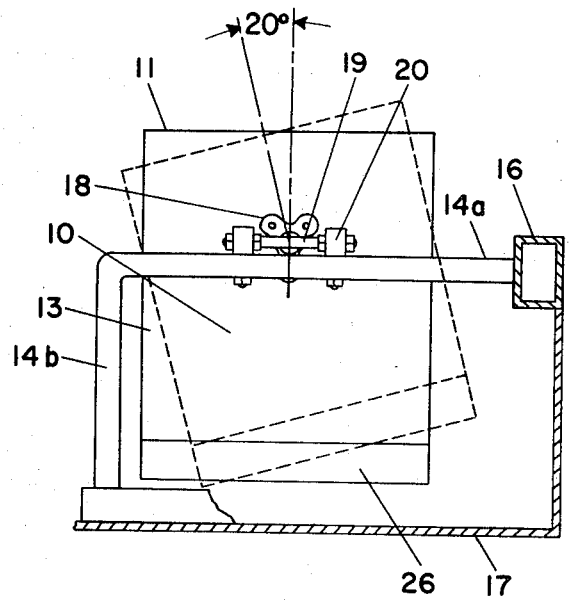
FIG. 2 is a rear elevation view of the seat of FIG. 1 showing the sway position of the seat in response to centrifugal force in phantom lines and a portion of the vehicle in section.
Figure 3:
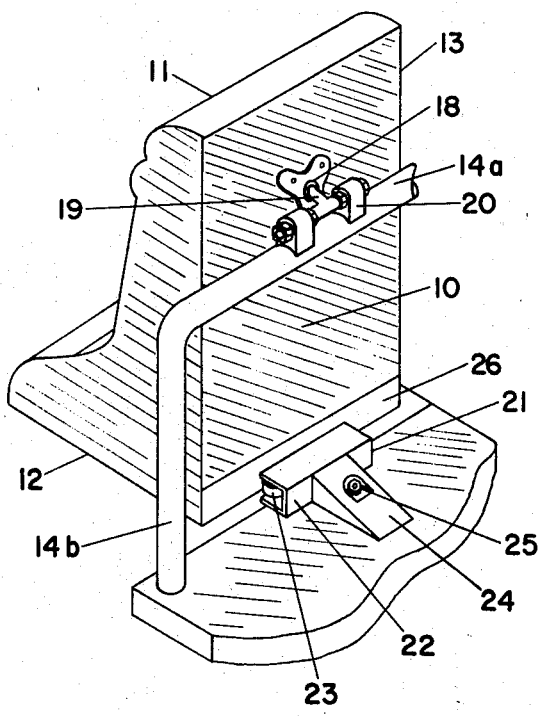
FIG. 3 is a fragmentary rear perspective view of the motor vehicle seat of FIG. 1 embodying my invention.
Figure 4:
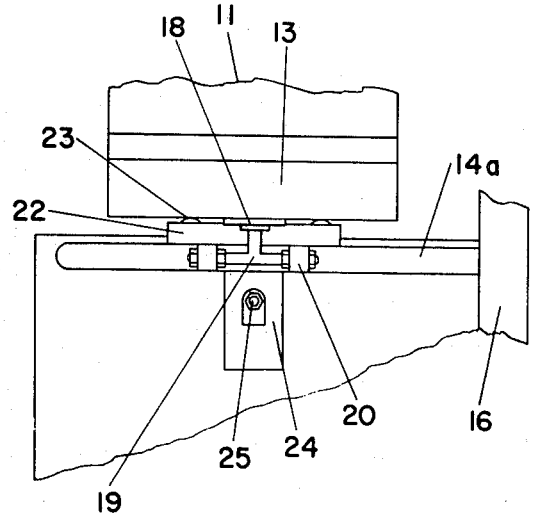
FIG. 4 is a fragmentary plan view of the seat of FIG. 1.

The pivotal connecting means 15 for seat 11 comprises a seat sway bearing 18 fixed to the upper back portion 13 of the seat and a T shaped metal connector 19 journaled into the sway bearing 18 for pivotal swaying about a longitudinal axis as shown in FIG. 2. The wings of the T shaped connector are journaled in swing bearings 20 rigidly attached to the horizontal leg 14a of the support bar 14 for swinging movement about a transverse axis as shown in FIG. 1.

The seat 11 is maintained in normal upright position shown in full lines in the drawings by a break-away backstop assembly shown generally at 21. This back stop assembly has a horizontally disposed steel channel 22 with roller bearings 23 positioned therein. The steel channel is attached to a metal wedge 24 which is fixed to the floor by a shear bolt 25. The roller bearings 23 run on a metal plate 26 mounted on the back of the lower edge of the seat. Upon collision impact from the rear of the vehicle, the bolt 25 will be sheared by the rearward axial force of the pivotal seat and cause the backstop assembly to give way, thus allowing the seat to pivot rearwardly.

As shown in FIG. 1, a front end collision will cause the seat 11 to swing upwardly and forwardly on bearings 20 into an "impact" position wherein the bottom portion 12 of the seat will be in a substantially upright position. Thus, the forward momentum of the occupant's body will be directed into the bottom portion 12 of the seat which will prevent the occupant from being thrown forwardly into the windshield of the vehicle.

In a rear end collision, the rearward force of the seat 11 will cause the breaking away of backstop 21 whereby the seat will swing rearwardly about its horizontal support, thus directing the momentum of the occupant's body into the bottom portion 12 of the rearwardly pivoted seat. This action greatly reduces the chance of "whiplash" injury.

As shown in FIG. 2, the centrifugal force exerted on the vehicle and the seat when making a turn will cause the seat to pivot or sway to the right or left depending on the direction of the turn. The back of the seat moves freely on the abutting roller bearings of the backstop assembly.

It is understood that my invention is not confined to the particular construction or arrangement of parts herein illustrated and described but embraces all such modified forms thereof as come within the scope of the following claims.

I claim:

1. In a motor vehicle, a safety seat construction for reducing the adverse effects on a passenger due to sudden impact from the front or side of the vehicle, said safety seat construction comprising:
    (a) a rigid support member for fixed attachment to said vehicle and extending above the floor thereof,
    (b) an individual bucket seat having a generally horizontal seat portion and upright back portion,
    (c) pivotal connecting means attached to the back portion of said seat suspending said seat from said support member for pivotal movement about both transverse and longitudinal axes,
    (d) a bearing assembly for fixed attachment to said vehicle below said connecting means, and
    (e) a bearing plate fixedly attached on said seat for engagement rearwardly on said bearing assembly and being freely pivotable forwardly therefrom about said pivotal connecting means.

2. In a motor vehicle, the safety seat construction as specified in claim 1 wherein said bearing assembly is mounted with a break-away connection to permit said seat to swing rearwardly on impact from the rear of said motor vehicle.

References Cited

UNITED STATES PATENTS

| | | | |
|---|---|---|---|
| 14,890 | 5/1856 | Thomas | 297—314 X |
| 1,347,594 | 7/1920 | Salinger | 296—65 |
| 2,647,791 | 8/1953 | Barenyi | 296—64 |
| 3,112,955 | 12/1963 | Stolz. | |

LEO FRIAGLIA, Primary Examiner

J. A. PEKAR, Assistant Examiner

U.S. Cl. X.R.

297—314